United States Patent [19]

Teraoka et al.

[11] Patent Number: 4,735,108
[45] Date of Patent: Apr. 5, 1988

[54] POWER TRANSMISSION DEVICE

[75] Inventors: Masao Teraoka, Sano; Osamu Ishikawa, Tochigi; Makoto Hagiwara, Utsunomiya, all of Japan

[73] Assignee: Tochigifujisangyo Kabushikigaisha, Tochigi, Japan

[21] Appl. No.: 800,536

[22] Filed: Nov. 21, 1985

[51] Int. Cl.⁴ .................. F16D 43/04; F16D 43/30; F16H 35/04
[52] U.S. Cl. .................................... 74/650; 192/48.8; 192/50
[58] Field of Search ............... 192/48.8, 49, 50, 48.1; 74/650

[56] References Cited

U.S. PATENT DOCUMENTS

| 2,106,946 | 2/1938 | Frederickson | 74/650 |
| 2,175,520 | 10/1939 | Frederickson | 74/650 |
| 2,397,673 | 4/1946 | Lewis | 74/650 |
| 2,720,790 | 10/1955 | Schou | 74/711 |
| 4,400,996 | 8/1983 | Schou | 74/650 |
| 4,498,355 | 2/1985 | Schou | 74/650 |
| 4,598,609 | 7/1986 | Nellums et al. | 74/650 |

FOREIGN PATENT DOCUMENTS 77935 5/1983 Japan.
184322 10/1983 Japan.

Primary Examiner—Rodney H. Bonck
Assistant Examiner—David A. Testardi
Attorney, Agent, or Firm—Samuels, Gauthier, Stevens & Kehoe

[57] ABSTRACT

A power transmission device is provided. The device comprises a casing for receiving a torque input, output members arranged inside the casing, movable members provided movably around the output members respectively, one side face of each of the movable members forming a cam face, clutches adapted for connecting the casing with the output members, and a cam shaft fixed to the casing and located between the movable members, wherein the torque input of the casing is transmitted to the output members through two routes, i.e., through the cam and the movable members, and through the clutches. The power transmission device is further provided with several improved parts such as improved friction faces, resistant members, cam faces, and pin.

3 Claims, 16 Drawing Sheets

POWER TRANSMISSION DEVICE

BACKGROUND OF THE INVENTION

1. Field of the Invention

The present invention relates to a power transmission device which is arranged, for instance, between the rear wheel shafts of a 4-wheel drive vehicle.

2. Description of the Prior Art

This type of a conventional power transmission device is disclosed in Japanese Patent Publications No. SHO-58-184322 and SHO-58-77935. This technique is called as the "positive drive unit" in which all force necessary for coupling clutches is transmitted through a cam unit so that great load acts on the cam surface when driving the vehicle. As a result, the cam surface tends to cause stress destruction.

In the conventional power transmission device, oil grooves are formed on the friction faces to pass lubricant quickly so that the friction faces do not slip on each other due to the settlement of lubricant on the friction faces. The conventional power transmission device forms oil films on the friction faces by virtue of the sliding contact between the friction faces in the initial stage of the operation. After the continuous operation of the device, however, lubricant is not successively supplied to the oil grooves, and, in addition, lubricant on the friction faces flows out therefrom due to the centrifugal force that causes the burning of the friction faces.

SUMMARY OF THE INVENTION

An object of the present invention is to provide a power transmission device which transmits a torque input to wheel shafts through two routes.

Another object of the present invention is to provide a power transmission device in which lubricant is always supplied uniformly to the friction faces.

The other object of the present invention is to provide a power transmission device which is provided with a means for reducing the sliding movement between a movable member and an output member.

Other objects and advantages of the present invention will be explained in detail hereunder with reference to the accompanied drawings.

DETAILED DESCRIPTION OF THE EMBODIMENT

The details of the present invention are now described with reference to accompanied drawings.

Figure 1:
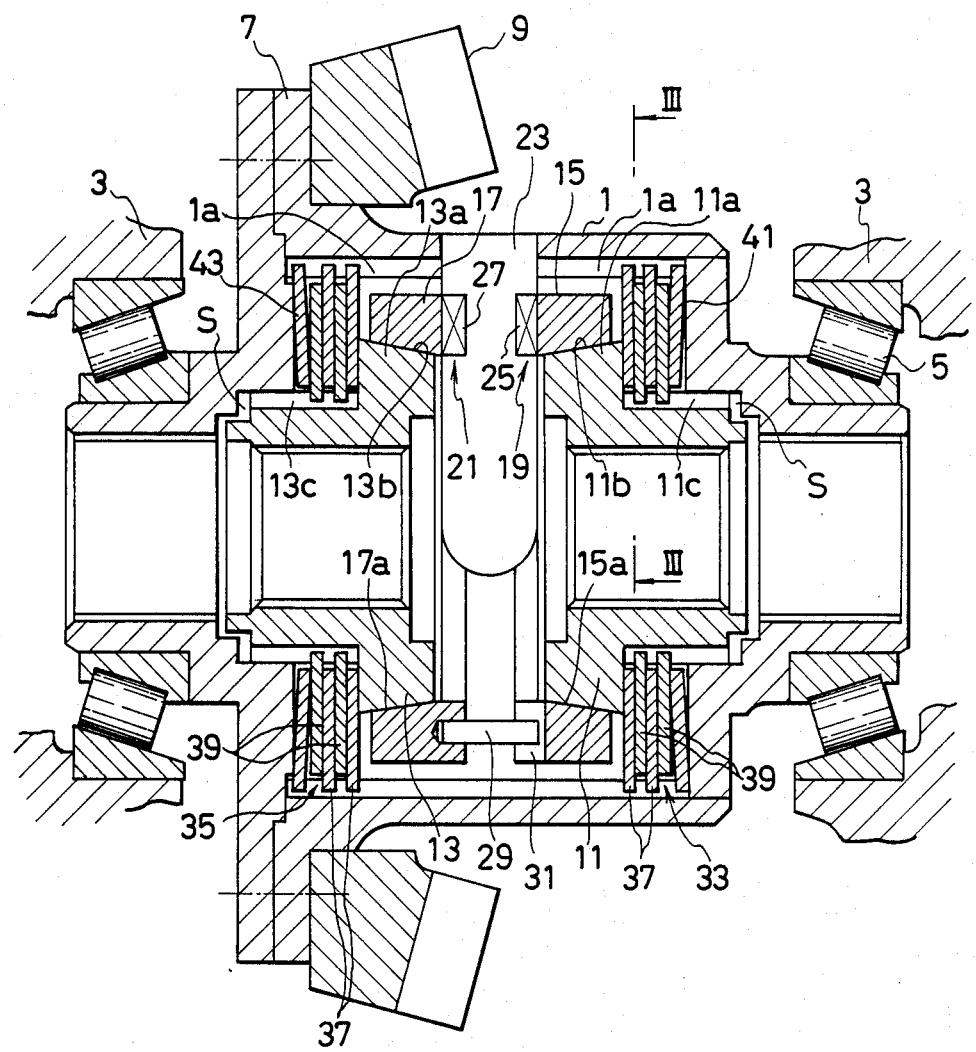
FIG. 1 is a general cross sectional view showing a power transmission device according to the present invention.

FIG. 1 is a general cross sectional view showing a power transmission device according to the present invention. The first embodiment of the present invention will be described with reference to FIGS. 1 to 5. The upper half portion and the lower half portion of the device in the figure are orthogonal to each other. A casing 1 is an input member which receives a torque input, said casing 1 being supported by a housing 3 in a freely rotatable manner through bearings 5. A flange 7 of the casing 1 is provided with a ring gear 9 which is meshed with a drive pinion (not shown) connected to a propeller shaft (not shown).

The housing 3 is filled with lubricant which enters into the casing 1 through holes and gaps formed on the casing 1 to lubricate each portion.

At the rotational center of the casing 1, a first and a second output members 11 and 13 are provided. The members 11 and 13 are supported by the casing 1 in a freely rotatable manner. Gaps S are provided between the external portion of the first output member 11 and the casing 1, and between the external portion of the second output member 13 and the casing 1 respectively. The gaps S enable the first output member 11 and the second output member 13 to move in thrusting directions. At the shaft centers of the first output member 11 and the second output member 13, wheel shafts (not shown) are engaged respectively by means of splines. A first large diameter portion 11a and a second large diameter portion 13a are provided on internal sides of the first output member 11 and the second output member 13 respectively. The periphery of the first large diameter portion 11a is provided with a first fitting face 11b, and the periphery of the second large diameter portion 13a with a second fitting face 13b, each of the fitting faces reducing its diameter toward the middle of the casing 1.

The first fitting face 11b is engaged with a ring like first movable member 15, and the second fitting face 13b with a ring like second movable member 17. A first cone face 15a is formed along the internal periphery of the first movable member 15, and a second cone face 17a along the second movable member 17. The cone faces 15a and 17a correspond to the first fitting face 11b and the second fitting face 13b respectively.

The first movable member 15 moves along one axis of casing 1 to engage with the first output member 11, and the second movable member 17 moves along the same axis to engage with the second output member 13.

Figure 2A:
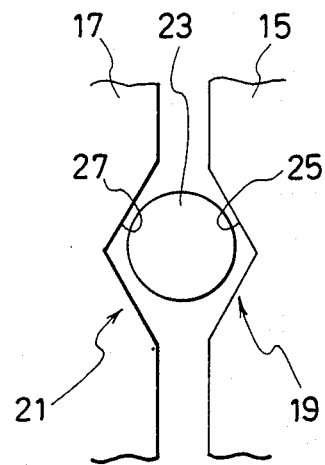
FIG. 2(a) is a cross sectional view showing cam means of the present invention.
Figure 2B:
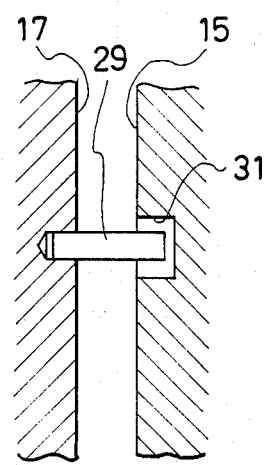
FIG. 2(b) is a cross sectional view showing a pin portion of the present invention.

The facing sides of the first movable member 15 and the second movable member 17 are provided with a first cam means 19 and a second cam means 21 respectively which move the first movable member 15 and the second movable member 17 respectively according to the rotation of the casing 1. The first cam means 19 and the second cam means 21 comprise a cam shaft 23, a first cam face 25, and a second cam face 27. The cam shaft 23 is supported by the casing 1 between the first movable member 15 and the second movable member 17. The first cam face 25 and the second cam face 27 have angle like shapes respectively as shown in FIG. 2(a). The first cam face 25 is formed on the first movable member 15, and the second cam face 27 on the second movable member 17. Between the first movable member 15 and the second movable member 17, a pin 29 is arranged to regulate the relative rotation of the first and the second movable members 15 and 17 within a fixed range. As shown in Fig. 2(b), one end of the pin 29 is fixed to the second movable member 17 and the other end is received in a recess 31 formed on the first movable member 15. The relationship between the pin 29 and the recess 31 is such that the pin 29 can slightly move relative to the recess 31 in the direction of the rotation of the first and the second movable members 15 and 17.

Figure 3:
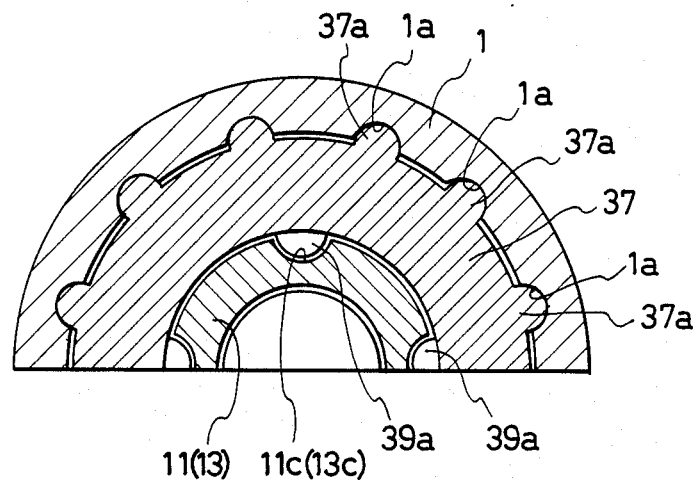
FIG. 3 is a cross sectional view along the line III—III shown in FIG. 1.

Between the external side of the first output member 11 and the casing 1, a first multiple disc clutch 33 which connects the casing 1 to the first output member 11 is provided, said casing 1 and said first output member 11 having been connected together by the transition of the first movable member 15. Between the external side of the second output member 13 and the casing 1, a second multiple disc clutch 35 which connects the casing 1 to the second output member 13 is provided, said casing 1 and said second output member 13 having been connected together by the transition of the second movable member 17. Each of the first multiple disc clutch 33 and the second multiple disc clutch 35 has a plurality of friction plates 37 on the casing side and a plurality of friction plates 39 on the output members side. As shown in FIG. 3, a plurality of engaging projections 37a are arranged on each of the peripheries of the friction plates 37. The engaging projections 37a engage with engaging recesses 1a formed on the internal periphery of the casing 1. The engaging recesses 1a are formed along the axis of the casing 1 so that the friction plates 37 may move in a thrusting direction. On the internal peripheries of the friction plates 39, a plurality of engaging projections 39a are provided. The projections 39a engage with engaging recesses 11c (13c) formed on the external periphery of the first output member 11 (the second output member 13). The engaging recesses 11c (13c) are formed along the axis of the first output member 11 (the second output member 13) so that the friction plates 39 may move in a thrusting direction.

A first thrusting means 41 is arranged between the first multiple disc clutch 33 and the side wall of the casing 1. A second thrusting means 43 is arranged between the second multiple disc clutch 35 and the side wall of the casing 1. The first thrusting means 41 and the second thrusting means 43 comprise plate springs respectively. The first thrusting means 41 presses the first multiple disc clutch 33 against the first large diameter portion 11a of the first output member 11. The second thrusting means 43 presses the second multiple disc clutch 35 against the second large diameter portion 13a of the second output member 13. Due to the pressing force of the first thrusting means 41, the friction connection between the first fitting face 11b of the first output member 11 and the first cone face 15a of the first movable member 15 is given with preliminary pressure. In the same way, due to the pressing force of the second thrusting means 43, the friction connection between the second fitting face 13b of the second output member 13 and the second cone face 17a of the second movable member 17 is given with preliminary pressure.

The operation of the first embodiment is now described.

Figure 4A:
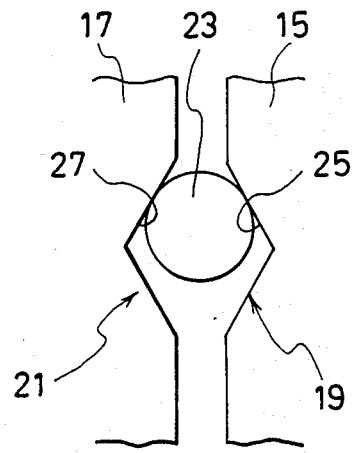
FIGS. 4(a) to 5(b) are views showing the operation of the first embodiment according to the present invention.
Figure 4B:
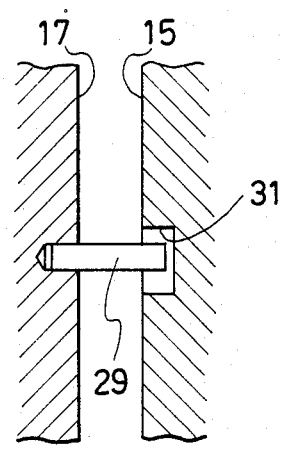

In driving a vehicle straight, the casing 1 receives a torque input through the ring gear 9. According to the rotation of the casing 1, the cam shaft 23 rotates around the axis of the casing 1. Since the friction connections between the first movable member 15 and the first output member 11, and between the second movable member 17 and the second output member 13 are given with preliminary pressure by the first thrusting means 41 and the second thrusting means 43 respectively, the first movable member 15 and the second movable member 17 tend to stay as they are with respect to the cam shaft 23. As a result, the cam shaft 23 abuts against the first cam face 25 and the second cam face 27 as shown in FIG. 4(a) so that the first movable member 15 and the second movable member 17 are moved toward external sides respectively along their axes due to the cam actions of the first cam means 19 and the second cam means 21 respectively. According to the movement, the first cone face 15a is fitted with the first fitting face 11b, and the connection of the first multiple disc clutch 33 is made through the first large diameter portion 11a of the first output member 11. Similarly, the second movable member 17 is fitted with the second output member 13 so that the second multiple disc clutch 35 is connected. Accordingly, the torque input of the casing 1 is transmitted to the wheel shafts (not shown), on the one hand, through the cam shaft 23, the first and second movable members 15 and 17, and, on the first and second output members 11 and 13, and on the other hand, through the first and second multiple disc clutches 33 and 35, and the first and second output members 11 and 13. As mentioned in the above, the power transmission route between the casing 1 and each of the first and second output members 11 and 13 is divided into two, one on the side of the first and second movable members 15 and 17 and the other on the side of the first and second multiple disc clutches 33 and 35 so that the load acting between the cam shaft 23 and the first and second cam faces 25 and 27, and the load acting between the first and second movable members 15 and 17 and the first and second output members 11 and 13 are reduced.

Figure 5A:
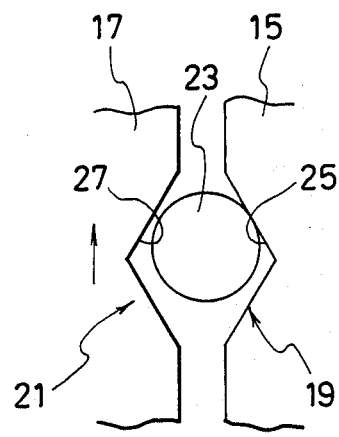
Figure 5B:
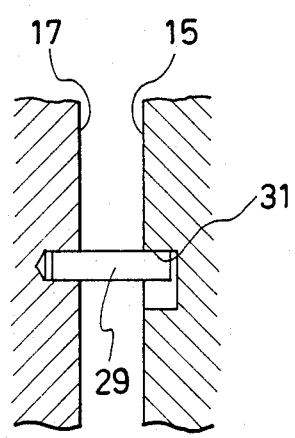

If the vehicle curves to the right, a wheel on the left side on FIG. 1 shall rotate faster than a wheel on the right side. The second movable member 17 moves relative to the first movable member 15 in an arrow direction shown in FIG. 5(a) through the second output member 13 according to the increase of the angular speed of the left wheel. In a state shown in FIG. 5(a), the pin 29 abuts against one end of the recess 31 as shown in FIG. 5(b) to limit the relative movement of the first movable member 15 and the second movable member 17. The cam action of the second cam means 21 is released so that the friction connection between the second movable member 17 and the second output member 13 and the friction connection of the second multiple disc clutch 35 become the level of the preliminary pressure caused by the second thrusting means 43. As a result, the second output member 13 can rotate relative to the first output member 11 in accordance with the increase of the angular speed of the left wheel. At this moment, the torque input of the casing 1 is continuously transmitted to the right wheel so that the cornering can be performed smoothly.

If one wheel is on ice and the other on a dry paved road, the torque input of the casing 1 is securely transmitted to the wheel on the paved road because of the above mentioned cam action of the first cam means 19 or the second cam means 21 so that the vehicle may easily be driven even on such a bad road.

Figure 6:
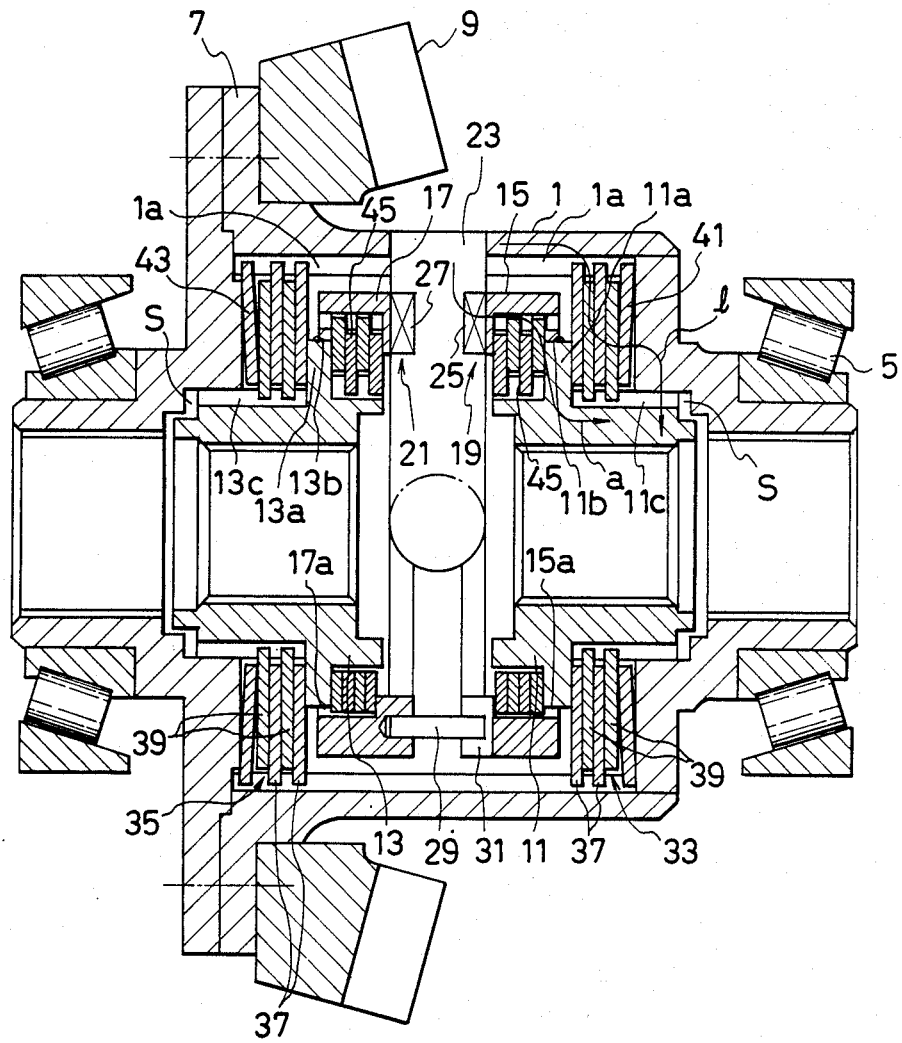
FIG. 6 is a cross sectional view showing the second embodiment according to the present invention.

FIG. 6 shows the second embodiment of the present invention, in which the first and the second movable members 15 and 17 are connected with and released from the first and the second output members 11 and 13 respectively by means of multiple disc clutches 45.

Figure 7:
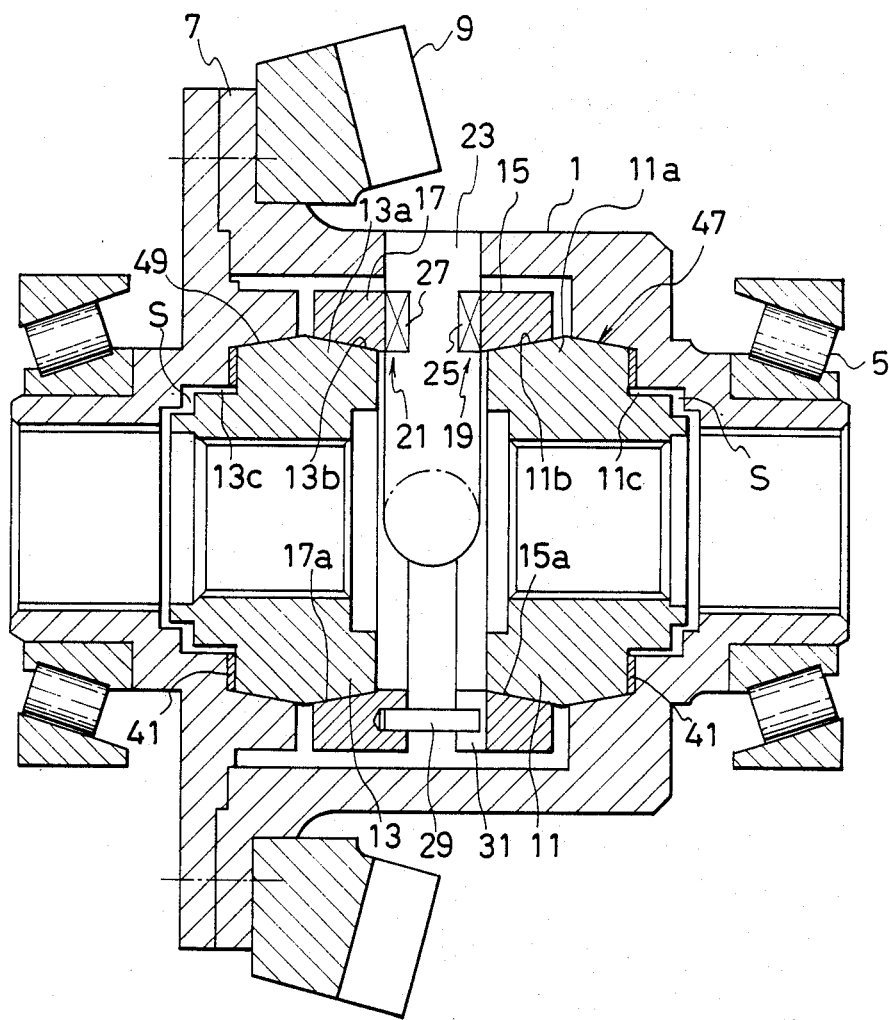
FIG. 7 is a cross sectional view showing the third embodiment according to the present invention.

FIG. 7 shows the third embodiment of the present invention, in which the first and the second clutches comprise a first cone clutch 47 and a second cone clutch 49 respectively.

Figure 8:
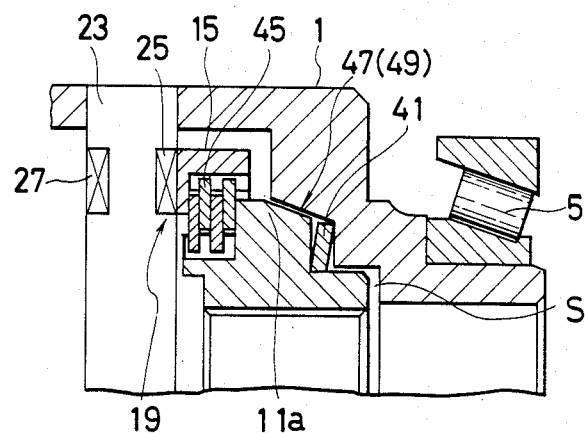
FIG. 8 is a cross sectional view showing the main portion of the fourth embodiment according to the present invention.

FIG. 8 shows the fourth embodiment of the present invention, in which the first and the second clutches of the second embodiment comprise the first cone clutch 47 and the second cone clutch 49 respectively.

Figure 9:
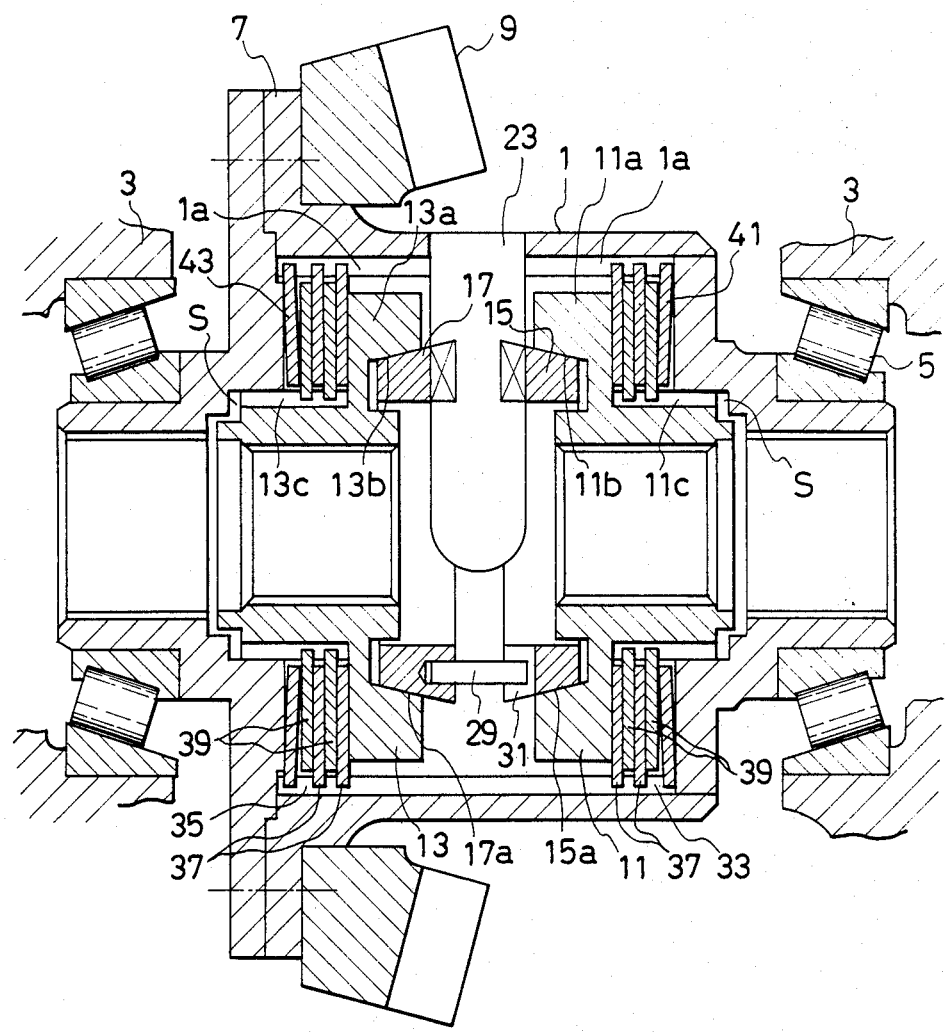
FIG. 9 is a cross sectional view showing the fifth embodiment according to the present invention.

FIG. 9 shows the fifth embodiment of the present invention, in which the first and the second movable members 15 and 17 of the first embodiment are received inside the first and the second output members 11 and 13 respectively.

Figure 10:
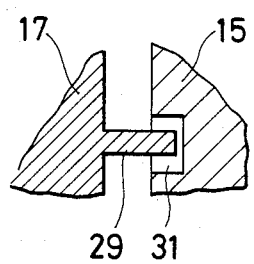
FIG. 10 is a cross sectional view showing the modification of a pin according to the present invention.

FIG. 10 shows a modification of the pin 29, in which the pin 29 is formed in one body with the second movable member 17. In this case, the press fit process of the pin 29 is omitted, and the strength of the pin is improved.

According the 1st to 5th embodiments mentioned above, the torque input of an input member can separately be transmitted to a first and a second output means through, on the one hand, a first and a second movable members, and, on the other hand, through a first and a second multiple disc clutches so that the load applied on a first and a second cam means, etc., may be reduced, and the durability of the device may be improved. Only the first and the second clutches are necessary to be provided to realize the objective, and a complex designing is not required for the first and second cam means so that the device may easily be processed with reduced cost.

The 6th to 10th embodiments, which will be explained hereunder with reference to FIGS. 1, and 11 to 15, relate to the friction faces of the device.

Figure 11:
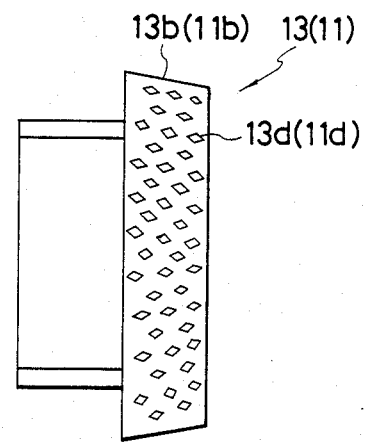
FIG. 11 is an elevation view showing an output member according to the sixth embodiment of the present invention.

The sixth embodiment is now explained with reference to FIGS. 1 and 11. As shown in FIG. 11, a plurality of oil holes 11d and 13d are recessed all over the fitting faces 11b and 13b respectively. Lubricant kept at the bottom of the housing 3 enters into the casing 1 through holes and gaps of the casing 1 and reaches each portion of the device. The lubricant also enters between the first movable member 15 and the first output member 11 and between the second movable member 17 and the second output member 13 to form oil films. The lubricant is further supplied to the oil holes 11d and 13d shown in FIG. 11. Due to the centrifugal force caused by the operation of the device, the lubricant in the form of films tends to flow in a rightward direction on FIG. 1 in the first output member 11, and in a leftward direction in the second output member 13. According to such flow of the lubricant, the lubricant in the oil holes 11d is supplied to a friction face between the first fitting face 11b and the first cone face 15a, and the lubricant in the oil holes 13d to a friction face between the second fitting face 13b and the second cone face 17a when the fitting faces 11b and 13b slide on the cone faces 15a and 17a respectively. As a result, the friction faces are always filled with lubricant. Since proper oil films are maintained on the friction faces, slips hardly occur on the friction faces.

Figure 12:
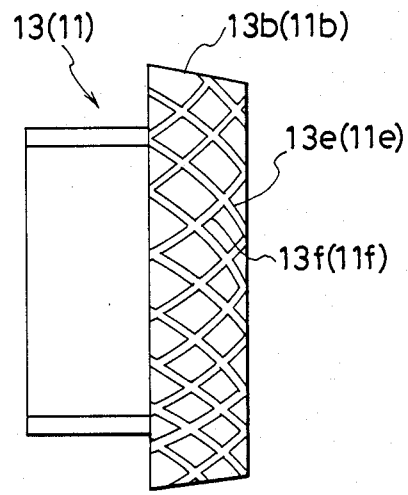
FIG. 12 is an elevation view showing an output member according to the seventh embodiment of the present invention.

FIG. 12 shows the seventh embodiment of the present invention. Oil grooves 11e (13e) slanting with respect to the center axis, and oil grooves 11f (13f) crossing the oil grooves 11e (13e) are arranged on the fitting face 11b (13b). In this embodiment, the oil grooves 11e (13e) become the oil passing grooves and simultaneously the oil grooves 11f (13f) becoming the oil stopping grooves in one rotating direction. In another rotating direction, the oil grooves 11e (13e) become oil stopping grooves, and the oil grooves 11f (13f) becoming oil passing grooves. Accordingly, this embodiment is useful in both rotational directions.

Figure 13:
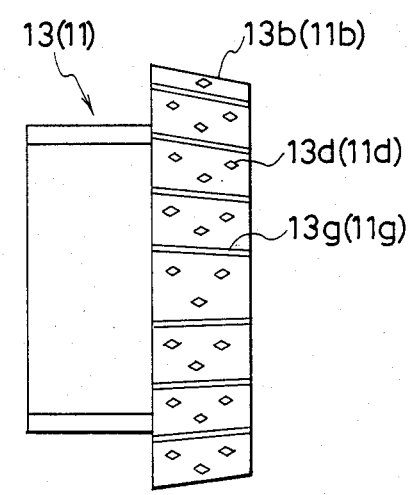
FIG. 13 is an elevation view showing an output member according to the eighth embodiment of the present invention.

FIG. 13 shows the eighth embodiment of the present invention, in which oil grooves 11g (13g) as the oil passing grooves are combined with oil holes 11d (13d) shown in FIG. 11.

Figure 14:
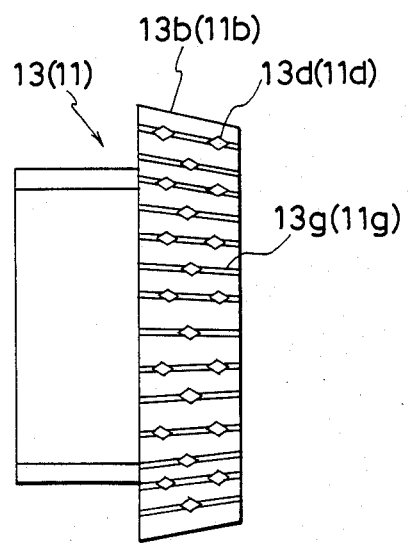
FIG. 14 is an elevation view showing an output member according to the ninth embodiment of the present invention.

FIG. 14 shows the ninth embodiment of the present invention, in which oil holes 11d (13d) are overlappingly provided on the oil grooves 11g (13g) shown in FIG. 13.

Figure 15:
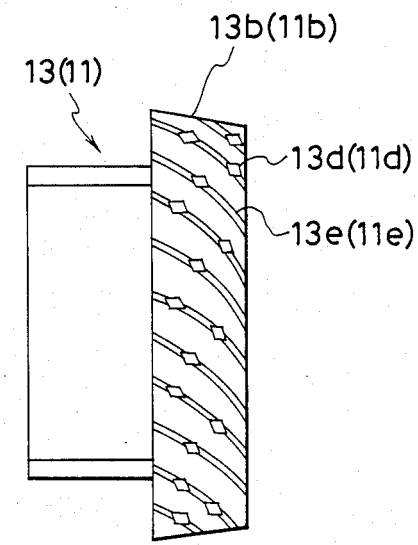
FIG. 15 is an elevation view showing an output member according to the tenth embodiment of the present invention.

FIG. 15 shows the tenth embodiment of the present invention, in which oil holes 11d (13d) are overlappingly provided on the oil grooves 11e (13e) shown in FIG. 12.

In the embodiments shown in FIGS. 12 to 15, oil grooves for passing lubricant are provided in addition to the oil holes so that the oil passing action is improved to maintain better oil films on the friction faces.

Figure 16:
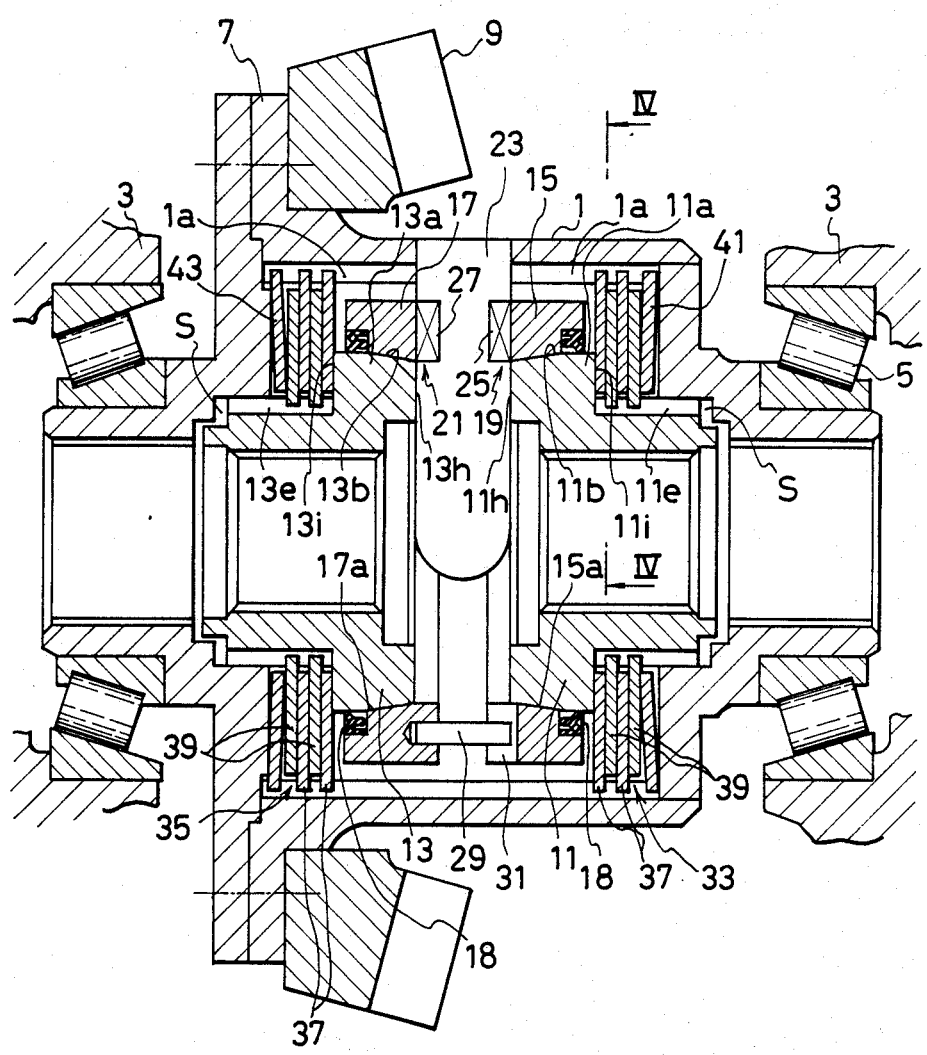
FIG. 16 is a view showing the eleventh embodiment of the present invention.
Figure 17:
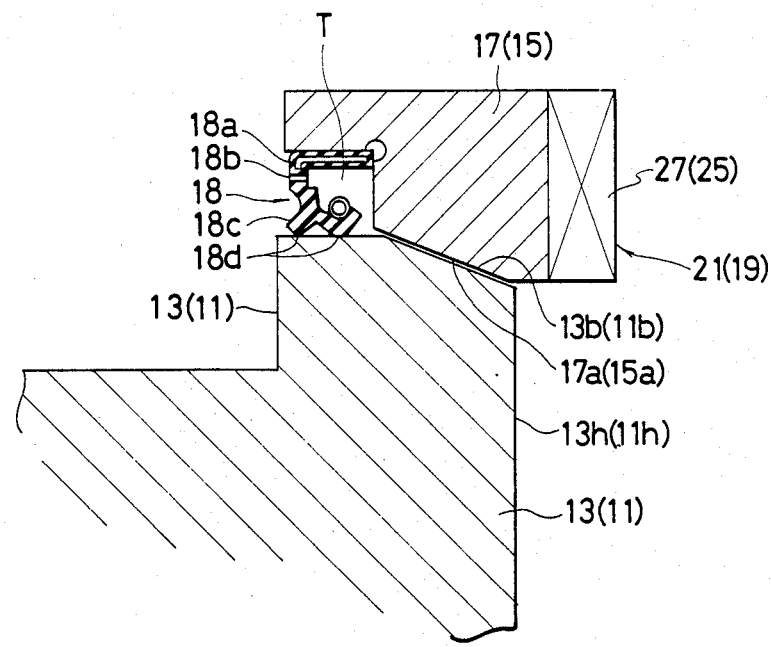
FIG. 17 is an enlarged cross sectional view showing the main portion of the eleventh embodiment.

The eleventh embodiment will be explained with reference to FIGS. 16 and 17. Between the first output member 11 and the first movable member 15 at the large circular end face 11i side of the first large diameter portion 11a, and between the second output member 13 and the second movable member 17 at the large circular end face 13i side of the second large diameter portion 13a, annular spaces T are formed respectively as shown in FIG. 17. Oil seals 18 are arranged as resistant members on the sides of the first and the second movable members 15 and 17 respectively to surround the spaces T and to give resistance with respect to the rotation of the first and the second movable members 15 and 17 respectively. A metal portion 18a of the oil seal 18 is provided with communication holes 18b to release lubricant filled in the space T. Slidable portion 18d located at the end of resilient member 18c which is made of rubber, etc., is in contact with the periphery of the first output member 11 (the second output member 13) to give resistance and sealing effect with respect to the rotation of the first movable members 15 (the second movable member 17) during the process of friction engagement of the first movable member 15 (the second movable member 17) and the first output member 11 (the second output member 13).

Lubricant kept at the bottom of the housing 3 enters into the casing 1 through holes and gaps of the casing 1 and reaches every portion of the device. The lubricant also enters into friction faces, i.e., between the first fitting face 11d and the first cone face 15a, and between the second fitting face 13d and the second cone faces 17a to form oil films. Due to the centrifugal force caused by the operation of the device, the lubricant in the form of oil films flows toward a rightward direction on FIG. 16 on the side of the first output member 11, and toward a leftward direction on FIG. 16 on the side of the second output member 13 so that the lubricant enters into the spaces T respectively to fill them with the lubricant. According to the flow of the lubricant, said centrifugal force supplies lubricant successively to the friction faces from the sides of the small circle end faces 11h and 13h respectively (in FIG. 17, from the right side of the second output member 13). The lubricant filled in the spaces T is discharged outside through the communication holes 18b. Since the spaces T are kept being filled with lubricant, the friction faces always maintain proper oil films thereon so that the burning and the wear of the friction faces are prevented.

Figure 23:
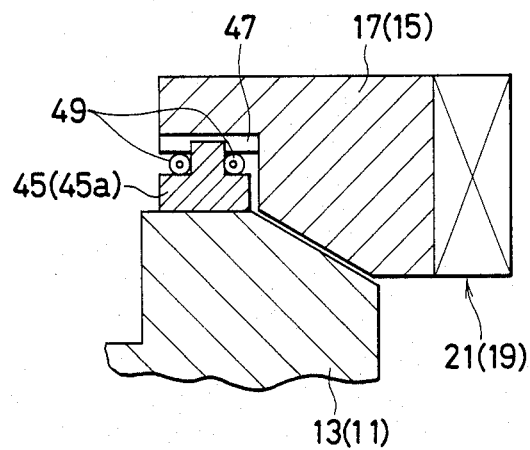
FIG. 23 is a cross sectional view showing the modification of the twelfth embodiment.
Figure 18:
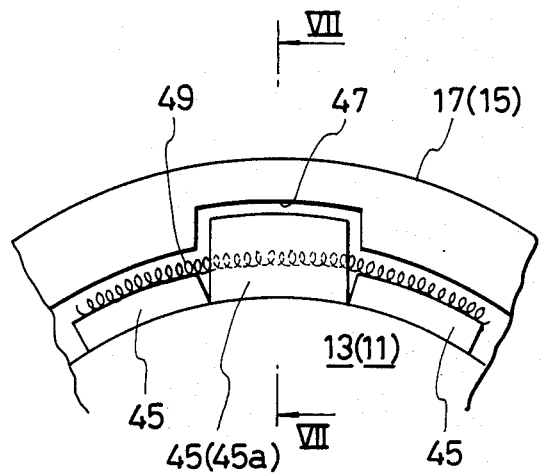
FIG. 18 is a front view showing the main portion of the twelfth embodiment according to the present invention.
Figure 19:
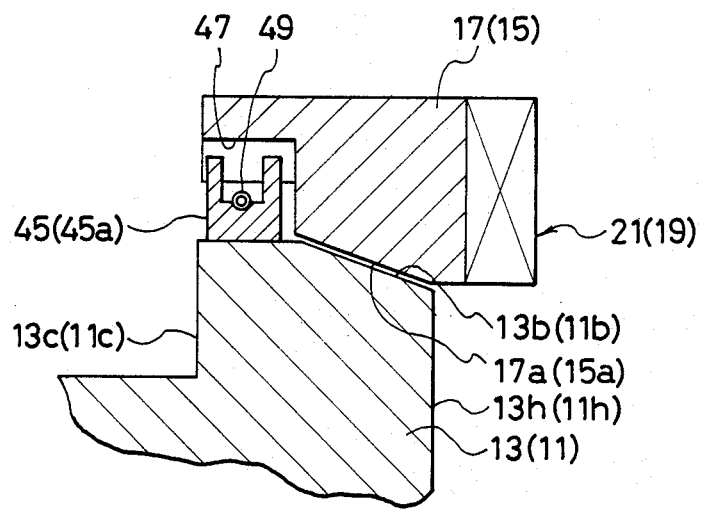
FIG. 19 is a cross sectional view along the line VII—VII shown in FIG. 18.

FIG. 18 and FIG. 19 which is a cross sectional view along the line VII—VII shown in FIG. 18 show the twelfth embodiment of the present invention. In this embodiment, a plurality of brake shoes 45 are in contact with the peripheries of the first and second output members 11 and 13 respectively. Some (45a) of the brake shoes 45 are formed to have recessed cross sectional shapes as shown in FIG. 19. The upper ends of the brake shoes 45a are inserted into recessed portions 47 formed on the internal peripheries of the first and second movable members 15 and 17 respectively. On the external peripheries of the brake shoes 45 (45a), a garter spring 49 is arranged to press the brake shoes 45 (45a) against the first and second output members 11 and 13 respectively to generate friction resistance. The brake shoes 45 may be formed to have projected portions as shown in FIG. 23 with two garter springs to provide stronger resistance.

Figure 20:
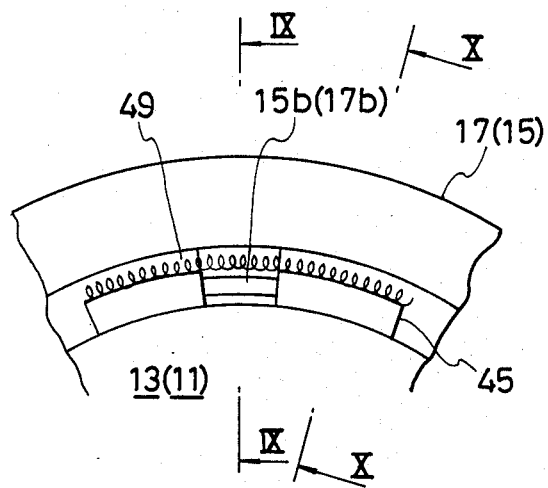
FIG. 20 is a front view showing the main portion of the thirteenth embodiment according to the present invention.
Figures 21, 22:
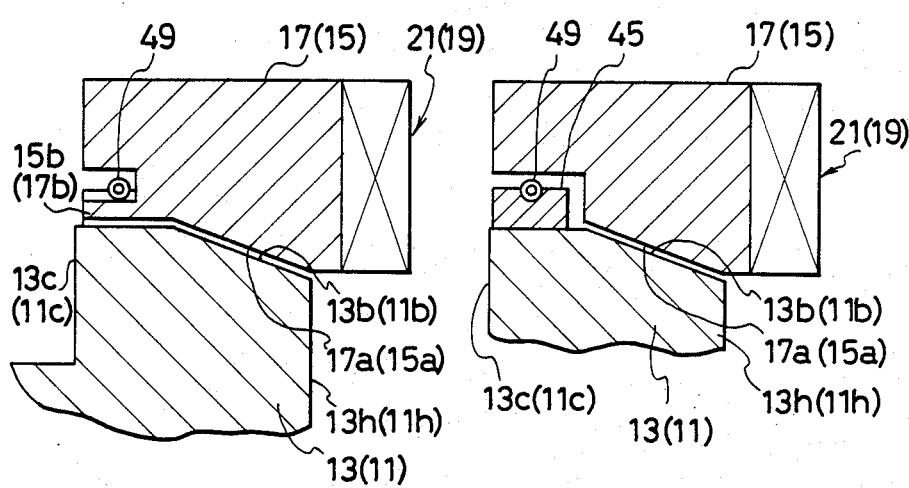
FIG. 21 is a cross sectional view along the line IX—IX shown in FIG. 20.
FIG. 22 is a cross sectional view along the line X—X shown in FIG. 20.

FIG. 20, FIG. 21 which is a cross sectional view along the line IX—IX shown in FIG. 20, and FIG. 22 which is a cross sectional view along the line X—X shown in FIG. 20 show the thirteenth embodiment of the present invention. In this embodiment, a plurality of brake shoes 45 are in contact with the external peripheries of the first and the second output members 11 and 13 respectively. Projections 15b (17b) formed on the first movable member 15 (the second movable member 17) are inserted between the brake shoes 45. A garter spring 49 is arranged on the peripheries of the brake shoes 45 to press the brake shoes 45 against the first output member 11 (the second output member 13) to cause friction resistance.

According to the 11th to 13th embodiments, resistant members are provided between the friction faces of the first rotational member and the second rotational member to provide resistance thereto during the process of the friction connection so that the wear of the cone faces is reduced, and the connection is securely performed because the initial resistance is certainly given. In the embodiments, it is also possible to arrange the resistant members on the first and the second output members 11 and 13 sides.

Figure 24A:
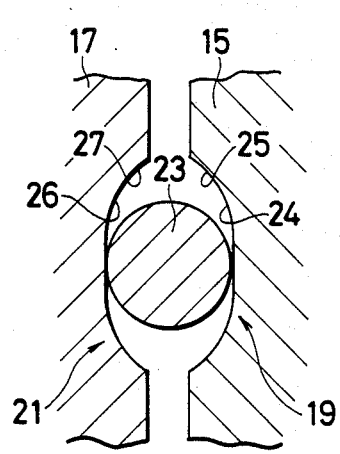
FIG. 24(a) is a cross sectional view showing the main portion of the fourteenth embodiment according to the present invention.
Figure 24B:
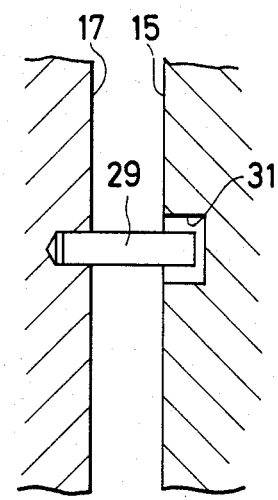
FIG. 24(b) is a view showing a pin for explaining the operation of the fourteenth embodiment.
Figure 25:
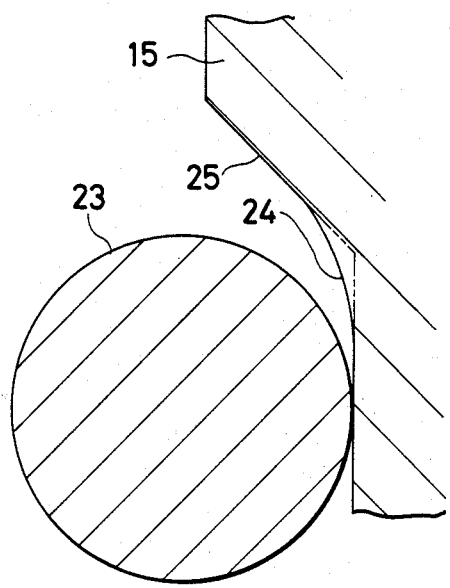
FIG. 25 is an enlarged cross sectional view showing the detail of the portion shown in FIG. 24(a)

The fourteenth embodiment will be explained with reference to FIGS. 1, and 24 to 27. The first cam face 25 and the second cam face 27 have angle like shapes as shown in FIGS. 24(a) and 25, and form arcuate curved portions 24 and 26 respectively at the starting positions of the engagement with the cam shaft 23. The first cam face 25 is formed on the first movable member 15, and the second cam face 27 on the second movable member 17. Between the first movable member 15 and the second movable member 17, a pin 29 is arranged to regulate the relative rotation of the first and second movable members 15 and 17 within a fixed range. As shown in FIG. 24(b), one end of the pin 29 is fixed to the second movable member 17 and the other end is received in the recess 31 formed on the first movable member 15. The relationship between the pin 29 and the recess 31 is such that the pin 29 can slightly move relative to the recess 31 in a direction of the rotation of the first movable member 15 and the second movable member 17.

Figure 26A:
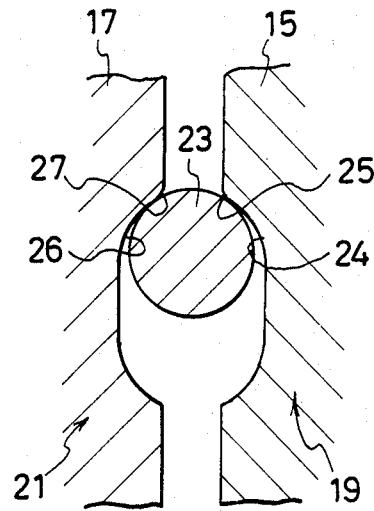
FIGS. 26(a) to 27(b) are views showing the operation of the fourteenth embodiment.
Figure 26B:
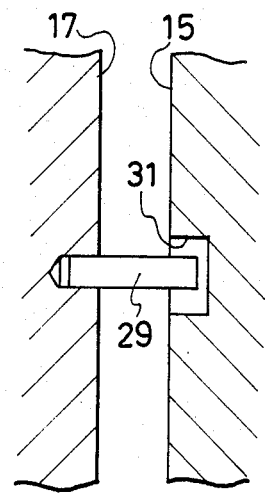

In driving straight a vehicle, the casing 1 receives a torque input through the ring gear 9. According to the rotation of the casing 1, the cam shaft 23 rotates around the axis of the casing 1. Since the friction connection between the first movable member 15 (the second movable member 17) and the first output member 11 (the second output member 13) is given with preliminary pressure by the first thrusting means 41 (the second thrusting means 43), the first movable member 15 (the second movable member 17) tends to stay as it is with respect to the cam shaft 23. As a result, the cam shaft 23 abuts against the first cam face 25 and the second cam face 27 as shown in FIG. 26 (a) so that the first movable member 15 and the second movable member 17 are moved toward external sides respectively along their axes due to the cam actions of the first cam means 19 and the second cam means 21 respectively. According to such a movement, the first cone face 15a is fitted with the first fitting face 11b, and the first multiple disc clutch 33 is connected through the first large diameter portion 11a of the first output member 11.

In the initial cam operation before the cam shaft 23 abuts against the first cam face 25 and the second cam face 27, the cam shaft 23 abuts against the curved portions 24 and 26. Therefore, axial force generated by the cam action in the initial operation becomes large so that the fitting process may be securely carried out without slipping. After the cam shaft 23 has abutted against the first cam face 25 and the second cam face 27, thrust force for fitting is reduced in comparison with the force in the initial stage so that unnecessary axial force is not applied for the fitting operation, and the durability of the fitting portions may be improved.

Similarly, the second movable member 17 is fitted with the second output member 13 so that the second multiple disc clutch 35 is connected. Accordingly, the torque input of the casing 1 is transmitted to the wheel shafts (not shown) through, on the one hand, the cam shaft 23, the first and second movable members 15 and 17, and the first and second output members 11 and 13, and, on the other hand, through the first and second multiple disc clutches 33 and 35, and the first and second output members 11 and 13.

Figure 27A:
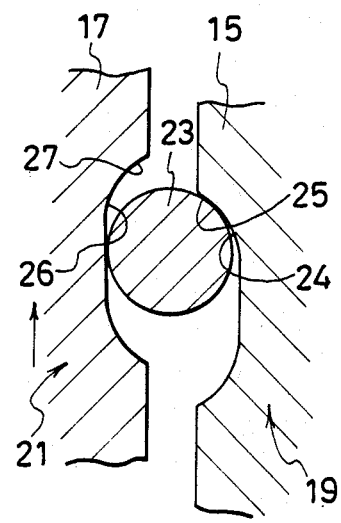
Figure 27B:
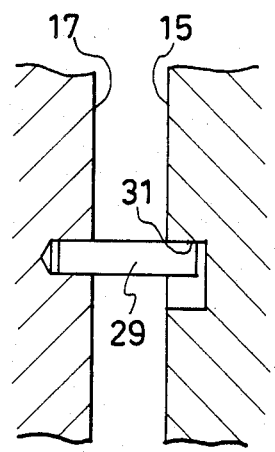

If the vehicle curves to the right, a wheel on the left side on FIG. 1 shall rotate faster than a wheel on the right side. The second movable member 17 moves relative to the first movable member 15 in an arrow direction shown in FIG. 27(a) through the second output member 13 according to the increase of the angular speed of the left wheel. In a state shown in FIG. 27(a), the pin 29 abuts against one end of the recess 31 as shown in FIG. 27(b) to limit the relative movement of the first movable member 15 and the second movable member 17. The cam action of the second cam means 21 is released so that the friction connection between the second movable member 17 and the second output member 13 and the friction connection of the second multiple disc clutch 35 become the level of the preliminary pressure caused by the second thrusting means 43. As a result, the second output member 13 can rotate relative to the first output member 11 in accordance with the increase of the angular speed of the left wheel. At this moment, the torque input of the casing 1 is continuously transmitted to the right wheel so that the cornering can be performed smoothly.

If one wheel is on ice and the other on a dry paved road, the torque input of the casing 1 is securely transmitted to the wheel on the paved road because of the above mentioned cam action of the first cam means 19 or the second cam means 21 so that the vehicle may easily be driven even on such a bad road.

The curved portions 24 and 26 may be provided all over the first and the second cam faces 25 and 27.

According to the 14th embodiment, axial force generated by the cam action may be made large in the initial stage of the operation so that the certainty of the clutch fitting may be improved. After the completion of the clutch fitting, the axial force is reduced to become small thrust force so that unnecessary force may not be applied for the fitted portions, and the durability of the portions may be improved.

Figure 28:
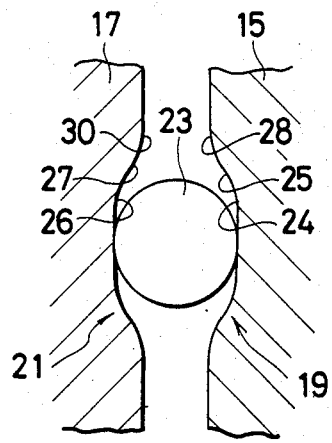
FIG. 28 is a cross sectional view showing the main portion of the fifteenth embodiment according to the present invention.
Figure 29:
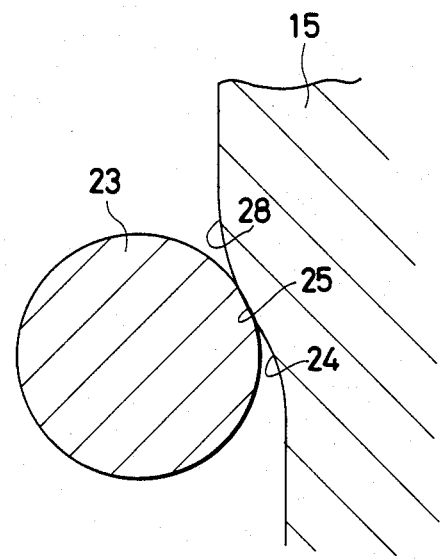
FIG. 29 is an enlarged cross sectional view showing the detail of the portion shown in FIG. 28.

The fifteenth embodiment of the present invention will be explained with reference to FIGS. 28 and 29. The first cam face 25 and the second cam face 27 have angle like shapes as shown in FIGS. 28 and 29, and form recessed curved faces 24 and 26 respectively at the starting positions of the engagement with the cam shaft 23. At the ending positions of the engagement, projected curved portions 28 and 30 are formed. The curved faces 24 and 26 and the curved portions 28 and 30 are formed with arcs having a fixed curvature. The first cam face 25 (the second cam face 27) extends continuously between the curved face 24 (26) and the curved portion 28 (30), said first cam face 25 (second cam face 27) being tangential to the curved face 24 (26) and the curved portion 28 (39). The first cam face 25 is formed on the first movable member 15, and the second cam face 27 on the second movable member 17.

Other constitution and operation of the 15th embodiment are the same as those of the 14th embodiment.

Figure 30:
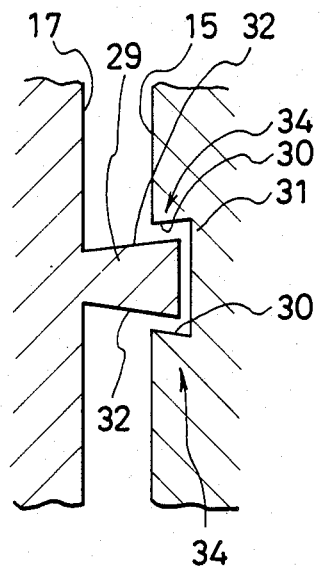
FIG. 30 is a cross sectional view showing the main portion of the sixteenth embodiment according to the present invention.
Figure 31A:
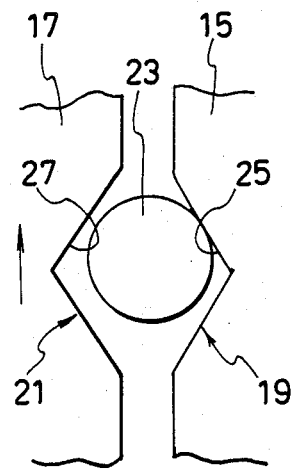
FIGS. 31(a) and 31(b) are views showing the operation of the sixteenth embodiment.

The sixteenth embodiment of the present invention will be explained with reference to FIGS. 1, 30, and 31. One end of the pin 29 is fixed to the second movable member 17 as shown in FIG. 30, the other end being received in the recessed portion 31 formed on the first movable member 15. The relationship between the pin 29 and the recessed portion 31 is such that the pin 29 can slightly move with respect to the recessed portion 31 in a rotational direction of the first and second movable members 15 and 17. The engaging faces 30 of the recessed portion 31 and the engaging faces 32 of the pin 29 are so slanted that the first movable member 15 and the second movable member 17 come close to each other by the engaging force applied on the engaging faces 30 and 32. The slanted engaging faces 30 and 32 thus constitute a cam portion 34.

Figure 31B:
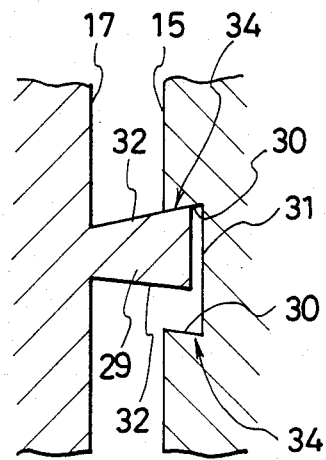

If the vehicle curves to the right, a wheel on the left side on FIG. 1 shall rotate faster than a wheel on the right side on the same figure. Therefore, the second movable member 17 moves relative to the first movable member 15 in an arrow direction shown in FIG. 31(a) through the second output member 13 according to the increase of the angular speed of the left wheel. In a state shown in FIG. 31(a), the pin 29 abuts against one end of the recess 31 as shown in FIG. 31(b) to limit the relative movement of the first movable member 15 and the second movable member 17. The cam action of the second cam means 21 is then released. In this case, the engaging face 32 of the cam portion 34 is lead by the engaging face 30 to move the pin 29 toward the recessed portion 31. According to the movement, the second movable member 17 moves to release securely the friction connection between the second movable member 17 and the second output member 13. As a result, the friction connection between the second movable member 17 and the second output member 13 and the friction connection of the second multiple disc clutch 35 become the level of the preliminary pressure given by the second thrusting means 43. The second output member 13, therefore, can rotate relative to the first output member 11 in accordance with the increase of the angular speed of the left wheel. At this moment, the torque input of the casing 1 is continuously transmitted to the right wheel so that the cornering can be performed smoothly.

If one wheel is on ice and the other on a dry paved road, the torque input of the casing 1 is securely transmitted to the wheel on the paved road because of the above mentioned cam action of the first cam means 19 or the second cam means 21 with the help of the action of the pin 29 so that the vehicle may easily be driven even on such a bad road.

According to the 16th embodiment, due to the action of the cam portion provided to the regulating means, the release of the first movable member or the second movable member can be securely performed at the time of cornering so that the stabilized cornering performance can be realized. Since the cam portion is made by utilizing the engaging faces, a special member is not necessary to be constituted.

What is claimed is:

1. A power transmission device comprising,
   a casing for receiving a torque input, said casing being supported by a housing in a freely rotatable manner about a rotation axis;
   first and a second output members provided inside said casing, said output members being freely rotatable around the rotation axis of said casing and movable in a thrusting direction;
   first and second movable members provided movably inside said first and second output members respectively, one side face of each of said movable members forming a cam face;
   first and second clutch means provided around said first and second output members respectively, said clutch means being adapted for connecting said casing with said output members;
   a cam shaft fixed to said casing and located between said first and second movable members;
   first and a second means for preliminary pressing one face of each of said first and second output members against one face of each of said first and second movable members respectively; and
   pin means provided between said first and second movable members to regulate the relative rotation of said movable members, wherein,
   said cam shaft abuts against said cam faces according to the rotation of said casing to cause said first and second movable members to frictionally engage with said first and second output members respectively as well as connecting said casing with said first and second output members via said first and second clutch means respectively, and, if the angular speed of one of said output members is caused to differ from the other, one of said cam faces is separated from said cam shaft so that the output member on the separated side may rotate relative to the other.

2. A power transmission device comprising:
   a rotatable input member for receiving input torque;
   first and second output members rotatable relative to and about the axis of rotation of said input member for delivering output torques, said output members being shiftable along said axis;
   first and second friction clutch means interposed respectively between said input member and said first and second output members, each of said first and second friction clutch means being engageable in response to shiftable movement of the respective output members to establish one drive connection between said input member and the respective output member;
   first and second cam actuated means interposed between said first and second output members, said cam actuated means being operative in response to differences between the rotational velocity of said input member and the rotational velocities of said output members to selectively engage and disengage said clutch means by shifting said output members along said axis;
   first and second resilient biasing means respectively interposed between said first and second friction clutch means and said input member for urging said first and second output members along said axis towards said first and second cam actuated means;
   said first and second cam actuated means comprising first and second pressure members respectively adapted to frictionally engage said first and second output members, said first and second pressure members being respectively circumferentially disposed around the first and second output members, cam surfaces on said pressure members, and a cam member interposed between and engageable with the cam surfaces of said pressure members, said cam member being connected to and rotatable with said input member, and said cam surfaces of the pressure members being arranged to coact with said cam member to shift said pressure members and the output members in frictional contact therewith along said axis while establishing another drive connection between said input member and the output members contacted by said pressure members.

3. A power transmission device as claimed in claim 2, wherein said first and second resilient biasing means respectively urge the first and second output members through the first and second friction clutch means.

* * * * *